(12) United States Patent
Seo

(10) Patent No.: US 7,403,295 B2
(45) Date of Patent: Jul. 22, 2008

(54) POSITION-DETECTING SYSTEM

(75) Inventor: Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 220 days.

(21) Appl. No.: 11/255,946

(22) Filed: Oct. 24, 2005

(65) Prior Publication Data

US 2006/0098098 A1 May 11, 2006

(30) Foreign Application Priority Data

Oct. 25, 2004 (JP) .......................... P2004-309415
Jan. 5, 2005 (JP) .......................... P2005-000329

(51) Int. Cl.
*G01B 11/14* (2006.01)
*G01B 11/26* (2006.01)

(52) U.S. Cl. .................... 356/614; 356/141.5

(58) Field of Classification Search ......... 356/601–625, 356/141.5, 139.03, 141.4; 250/559.13, 559.14, 250/237 R; 382/152, 154
See application file for complete search history.

(56) References Cited

U.S. PATENT DOCUMENTS

| | | | | |
|---|---|---|---|---|
| 4,419,012 | A * | 12/1983 | Stephenson et al. | 356/141.5 |
| 4,649,504 | A * | 3/1987 | Krouglicof et al. | 702/153 |
| 4,789,940 | A * | 12/1988 | Christian | 700/113 |
| 5,440,392 | A * | 8/1995 | Pettersen et al. | 356/620 |
| 5,884,239 | A * | 3/1999 | Romanik, Jr. | 702/150 |
| 5,956,661 | A * | 9/1999 | Lefebvre et al. | 702/150 |
| 5,974,348 | A * | 10/1999 | Rocks | 701/28 |
| 6,266,142 | B1 * | 7/2001 | Junkins et al. | 356/623 |
| 6,389,158 | B1 * | 5/2002 | Pettersen et al. | 382/154 |
| 6,466,325 | B1 * | 10/2002 | Gooch | 356/620 |
| 2003/0067544 | A1 | 4/2003 | Wada | |

2005/0168585 A1  8/2005 Uenaka et al.

(Continued)

FOREIGN PATENT DOCUMENTS

JP  10-142649  5/1998

(Continued)

OTHER PUBLICATIONS

English Language Abstract of JP 2001-117129.

(Continued)

*Primary Examiner*—Sang Nguyen
(74) *Attorney, Agent, or Firm*—Greenblum & Bernstein, P.L.C.

(57) ABSTRACT

A position-detecting system, which is used to detect a relative position of a movable member with respect to a fixed member, is provided. The system includes a plurality of light sources, a position-sensing device, and a light-source controller. The light sources are provided on one of the fixed member or the movable member, and emit a spotlights. The position-sensing device is provided on another one of the fixed member or the movable member. The position-sensing device receives the spotlight and outputs a position signal relating to the relative position in accordance with a position where the spotlight is received. The light-source controller controls an ON/OFF state of the plurality of light sources. The light-source controller continuously turns on one of the light sources when only a spotlight from light source is detected by the position-sensing device, and flashes two or more than two of the light sources when spotlights from two or more than two light sources are detected by the position sensing device.

3 Claims, 16 Drawing Sheets

U.S. PATENT DOCUMENTS

| | | |
|---|---|---|
| 2005/0169619 A1 | 8/2005 | Uenaka et al. |
| 2005/0190267 A1 | 9/2005 | Uenaka et al. |
| 2005/0232617 A1 | 10/2005 | Uenaka et al. |
| 2005/0244152 A1 | 11/2005 | Seo |
| 2005/0270379 A1 | 12/2005 | Seo |
| 2005/0276589 A1 | 12/2005 | Seo |

FOREIGN PATENT DOCUMENTS

| | | |
|---|---|---|
| JP | 11-072815 | 3/1999 |
| JP | 2001-117129 | 4/2001 |

OTHER PUBLICATIONS

English Language Abstract of JP 10-142649.

English Language Abstract of JP 11-072815.

\* cited by examiner

POSITION-DETECTING SYSTEM

BACKGROUND OF THE INVENTION

1. Field of the Invention

The present invention relates to a position-detecting system that detects a position of an object moving two dimensionally. Particularly, the invention relates to a position-detecting system that is provided as an element of an anti-shake device of a digital camera, and which detects a relative position of an imaging device with respect to an optical axis of a photographing lens.

2. Description of the Related Art

Conventionally, anti-shake devices (camera-shake compensation devices) are used in the digital camera field. An anti-shake device prevents or compensates for image blur produced on an imaging surface of an imaging device. This is achieved by moving a camera-shake compensation lens or the imaging device along a plane perpendicular to the optical axis of the photographing lens to counteract the camera-shake, which is induced during photographing. The anti-shake device is provided with a position-sensing system to detect a relative position of the imaging device with respect to the optical axis of the photographing lens (refer to Japanese unexamined patent publication No. 2001-117129). In this type of position sensing system, a two-dimensional position-sensing device (PSD) receives a spotlight emitted from a light source (LED), and thereby the relative position is detected in accordance with a position where the spotlight is received. Specifically, the two-dimensional position-sensing device (PSD) and the light source (LED) are provided on a fixed member and a moving member. The relative position of the moving member with respect to the fixed member is detected by detecting the position of the light which is made incident to the two-dimensional position-sensing device, so that the movement of the moving member or an object is detected.

SUMMARY OF THE INVENTION

The two-dimensional position-sensing device is a square shaped CCD of which the length of each side is at most about 2 millimeters. Therefore, according to the anti-shake device using this type of position-sensing device, only a shake within a range of ±1 mm about the neutral position can be compensated. Because of this limitation, a two-dimensional position-sensing device having a large light-receiving surface should be used. However, this increases size and cost.

Further, although a conventional two-dimensional position-sensing device can detect a position, movement direction, and displacement of an object having a motion that describes a two-dimensional trajectory, it can not detect rotation of the object even when the object is rotated on a two dimensional plane.

An aspect of the present invention is to provide a position-detecting system that is able to achieve wide-range position detection compared to a conventional position-sensing device, by using normal-size position-sensing devices.

Another aspect of the present invention is to provide a position-detecting system that is able to detect two-dimensional rotation in a plane, as well as two-dimensional translation.

According to one aspect of the present invention, a position-detecting system, which is used for detecting a relative position of a movable member with respect to a fixed member, is provided. The system includes a plurality of light sources, a position-sensing device, and a light-source controller.

The light sources are provided on one of the fixed member or the movable member, and emit spotlights. The position-sensing device is provided on another one of the fixed member or the movable member. The position-sensing device receives the spotlights and outputs a position signal relating to the relative position in accordance with a position where the spotlight is received. The light-source controller controls an ON/OFF state of the plurality of light sources. The light-source controller continuously turns on one of the light sources when only a spotlight from the light source is detected by the position-sensing device, and flashes two or more than two of the light sources when spotlights from the light sources are detected by the position-sensing device.

The light-source controller may control the ON/OFF state of the light sources in accordance with the position signal. The light sources can be arranged over an area larger than a light receiving area of the light-sensing device, which detects the spotlight. A distance between the light sources may be smaller than a width of a light receiving area of the light-sensing device, which detects the spotlight.

The position-detecting system can also be configured so that when a spotlight from one of the light sources is illuminated on one edge of the receiving area, a spotlight from another light source is illuminated on the other edge of the receiving area.

The position-sensing device can be a two-dimensional area senor. The light receiving area can be a rectangular shape where four spotlights are simultaneously detectable at the four corners of the light receiving area.

Preferably, only one of the light sources is turned on at the same time even when the light sources are flashing. In this case, two of the light sources may be alternately flashed at the same cycle.

Further, the light sources may be flashed so that three or more than three of the light sources are turned on in turn.

The position-detecting system may further include a position calculator that calculates the relative position in accordance with the ON/OFF state of the light sources.

According to another aspect of the present invention, a position-detecting system is provided that includes the plurality of light sources, the position-sensing device, and a light-source controller. The light-source controller flashes each of the light sources so that each of the light sources is turned on in turn.

Further, according to another aspect of the present invention, a position-detecting system is provided that includes, a movable member, a light source unit, a position-sensing device, a light-source controller, and a calculator.

The movable member is moved relative to a fixed member in a two-dimensional plane. The light source unit is provided on one of the fixed member and the movable member. The light source unit includes a plurality of light emitting devices which are separately disposed at a predetermined distance. The position-sensing device is provided on another one of the fixed member and the movable member. The position-sensing device receives light from the light source unit and detects a position where the light is received. The light-source controller selectively turns on one of the light emitting devices in a predetermined order. The calculator calculates a direction of motion, displacement, and rotation of the movable member in accordance with two pairs of position data. One pair of position data represents positions where light from a pair of light emitting devices is detected. The other pair of position data represents positions where light from the pair of light emitting devices is detected at a predetermined time interval after the one pair of position data is detected.

The number of light-emitting devices in the plurality of light emitting devices may be two. The light-source controller alternately turns on the two light emitting devices for the same interval. The movable member is rotatably supported with respect to the fixed member.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
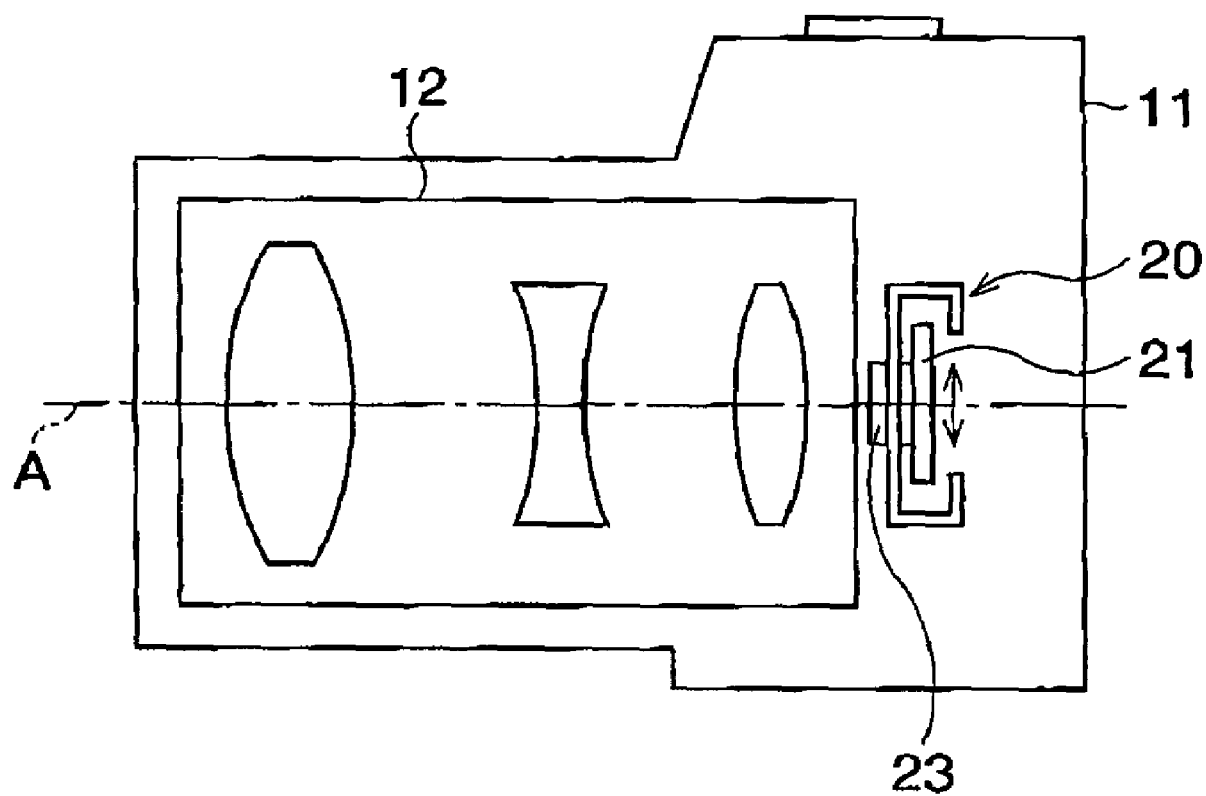
FIG. 1 schematically illustrates the configuration of a digital camera which is provided with a position-detecting system to which a first embodiment of the present invention is applied.

The present invention is described below with reference to the embodiments shown in the drawings.

FIGS. 1-5 illustrate a first embodiment of the present invention, where the invention is applied to a digital camera, as an example.

Referring to FIG. 1, a lens block 12 or a photographing optical system is provided inside a camera body 11. Behind the lens block 12, an anti-shake mechanism provided with an imaging device (CCD) 23, is arranged. A casing 21 of the anti-shake mechanism 20 is movable along a plane perpendicular to the optical axis "A" of the photographing optical system, thereby camera-shake induced by handshake can be compensated.

Figure 2:
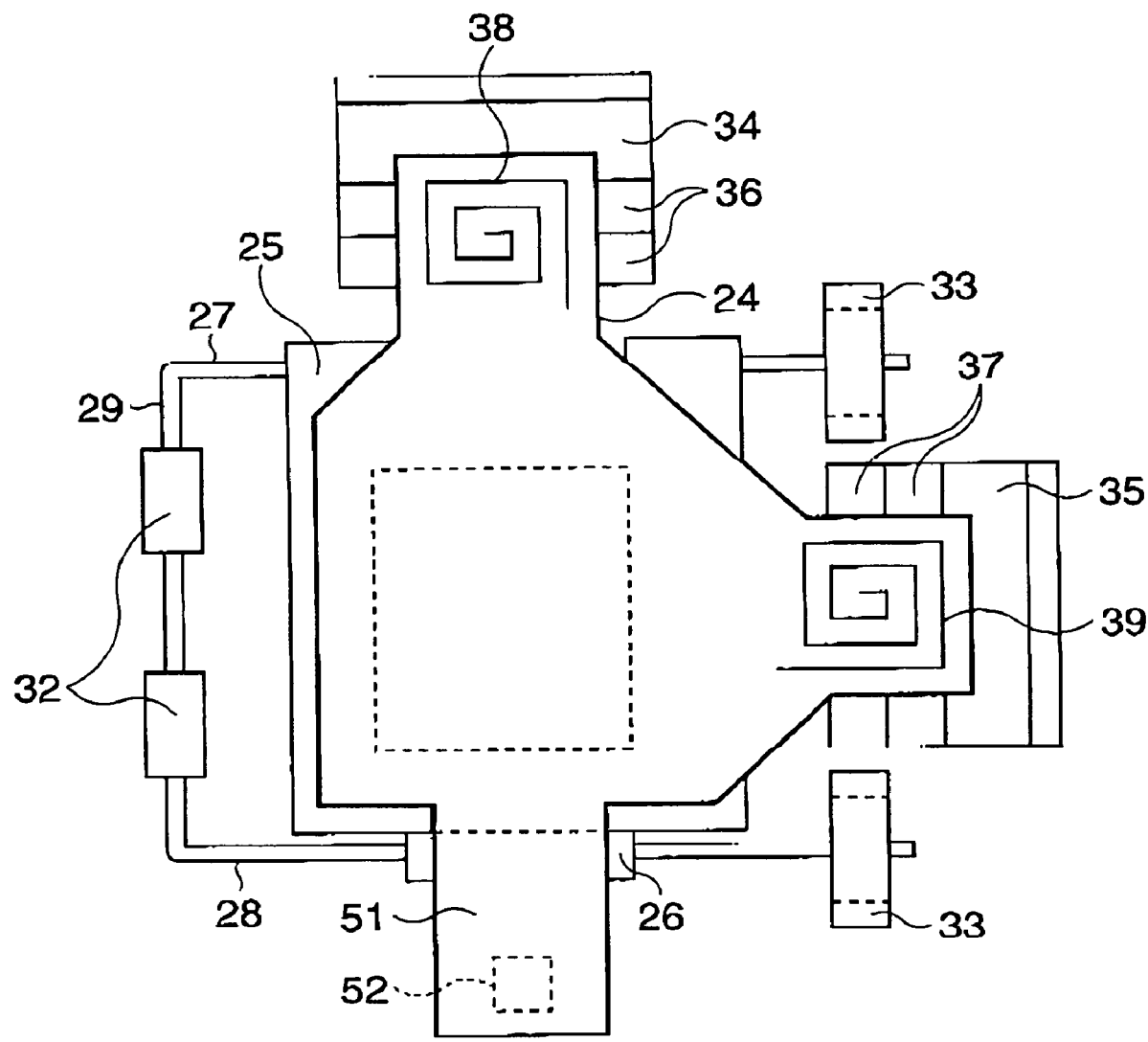
FIG. 2 is a plan view of an anti-shake mechanism.
Figure 3:
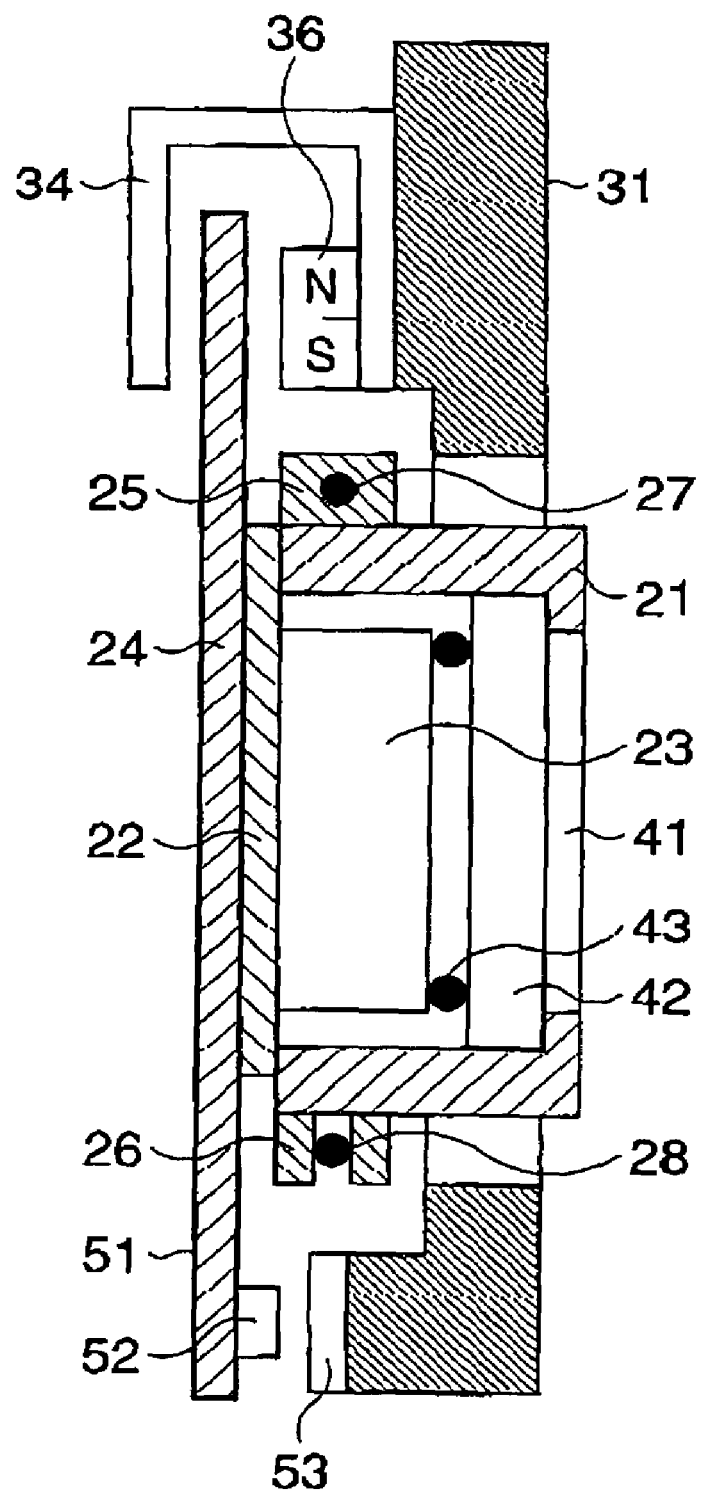
FIG. 3 is a sectional side elevation of the anti-shake mechanism.

With reference to FIGS. 2 and 3, structures of the anti-shake mechanism 20 will be explained. However, anti-shake methods or camera-shake compensation methods are well known in the art, therefore, an explanation of the methods will be omitted.

A fixed member 31 is fixed to a retaining frame (not shown) provided inside the camera body. A first support member 32, second support members 33, a first yoke 34, and a second yoke 35 are provided on the fixed member 31. The base plate 22 is attached on the casing 21 (a movable member). Further, the imaging device 23 is attached on the front surface of the base plate 22 and a coil-printed circuit board 24 is attached on the back surface of the base plate 22. Bearing members 25 and 26 provided on external sidewalls of the casing 21 are slidably guided by a pair of horizontal guide-shafts 27 and 28, which extends in the lateral direction in FIG. 2. As shown in FIG. 2, the left ends of the horizontal guide-shafts 27 and 28 are connected by a vertical guide-shaft 29. The vertical guide-shaft 29 is supported by the first support member 32 whereby the vertical guide-shaft 29 is movable in the vertical direction of FIG. 2. Note that, the right ends of the horizontal guide-shafts 27 and 28 are guided in the vertical direction by the second support members 33.

Consequently, the casing 21, the base plate 22, the imaging device 23, and the coil-printed circuit board 24 in FIG. 2, are transversely movable, along the horizontal guide-shafts 27 and 28. Further, the casing 21 and so on in FIG. 2 are vertically movable, together with the horizontal guide-shafts 27, 28 along the vertical guide-shaft 29.

A first magnet 36 and a second magnet 37 are respectively attached on an inside surface of the first yoke 34 and the second yoke 35. A first coil 38 and a second coil 39 which are formed as a spiral sheet coil pattern are provided on the surface of the coil-printed circuit board 24. The first coil 38 faces the first magnet 36 and the second coil 39 faces the second magnet 37.

Therefore, in accordance with the interaction between the current supplied to the first coil 38 and the magnetic field generated by the first magnet 36, the casing 21 and the other integrated members in FIG. 2, are guided by the first support member 32 and moved vertically. Further, in accordance with the interaction between the current supplied to the second coil 39 and the magnetic field generated by the second magnet 37, the casing 21 and the other integrated members in FIG. 2 are guided by the horizontal guide shafts 27 and 28, and moved laterally.

As shown in FIG. 3, an opening 41 which has almost the same size as the imaging device 23 is formed on the casing 21, at a position which faces the imaging device 23. Further, inside the casing 21, an optical low-pass filter 42 is provided. The optical low-pass filter 42 is fixed to the inside face of the casing 21 by an urging member 43 which is interposed between the optical low-pass filter 42 and the imaging device 23.

On the opposite side of the first coil 38, a rectangular-shaped extended board section 51 which extends from the coil-printed circuit board 24, downwardly in FIG. 2, is formed. On the surface of the extended board member 51, on the side facing the fixed member 31, a light-emitting unit 52 is provided. Further, on the fixed member 31, at the position facing the light-emitting unit 52, a position-sensing device 53, such as a two-dimensional area sensor, is arranged. As will be described later, the light-emitting unit 52 has nine LEDs (light sources) 52a-52i, see FIG. 5, which emit spotlights. The LEDs are distributed within an area which is larger than the light receiving area of the position-sensing device 53.

Figure 4:
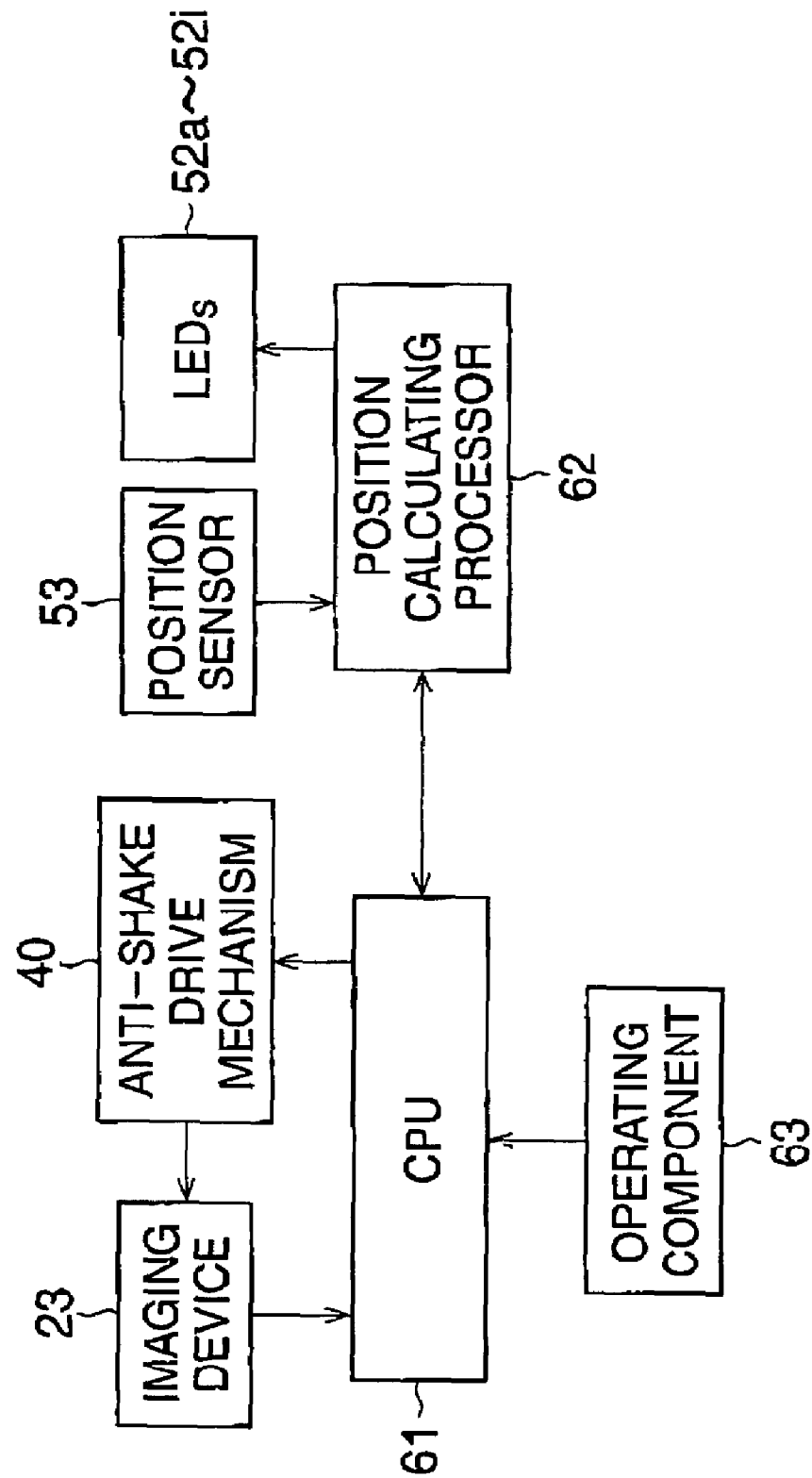
FIG. 4 is a block diagram of a control system that is used in the anti-shake operation.

FIG. 4 is a block diagram of a control system that is used to compensate for camera-shake or image blur.

An anti-shake drive mechanism 40 includes the first and second yokes 34, 35, the first and second magnets 36, 37, and the first and second coils 38, 39. The control of the electric supply to the coils 38 and 39 is carried out by a controller (CPU) 61. Namely, the imaging device 23 is moved by electromagnetic power induced by the supply of electric power to the coils 38 and 39, so that the camera-shake compensation is carried out by the controller 61.

In order to obtain the position of the imaging device 23 for the camera-shake compensation, a position calculating processor 62 is provided. The position calculating processor 62 receives position signals from the position-sensing device 53, which relates to the relative position of the imaging device 23 with respect to the fixed member 31. The position calculating processor 62 controls the On/Off state of the LEDs 52a-52i according to the position signals. The On/Off control of the LEDs will be explained later.

According to the position signals obtained by the position-sensing device 53 and the On/Off states of the LEDs 52a-52i, the position calculating processor 62 calculates the relative position of the imaging device 23 or the casing 21 with respect to the fixed member 31. The position data which represent the relative position is transmitted to the controller 61 and an amount by which the imaging device 23 should be moved is calculated from the position data by the controller 61, thereby the anti-shake drive mechanism 40 is controlled.

An operating component 63 is connected to the controller 61. The operating component 63 is provided on the camera body 11, see FIG. 1, and the camera-shake compensation is turned on or turned off by operating the operating component 63.

Figure 5:
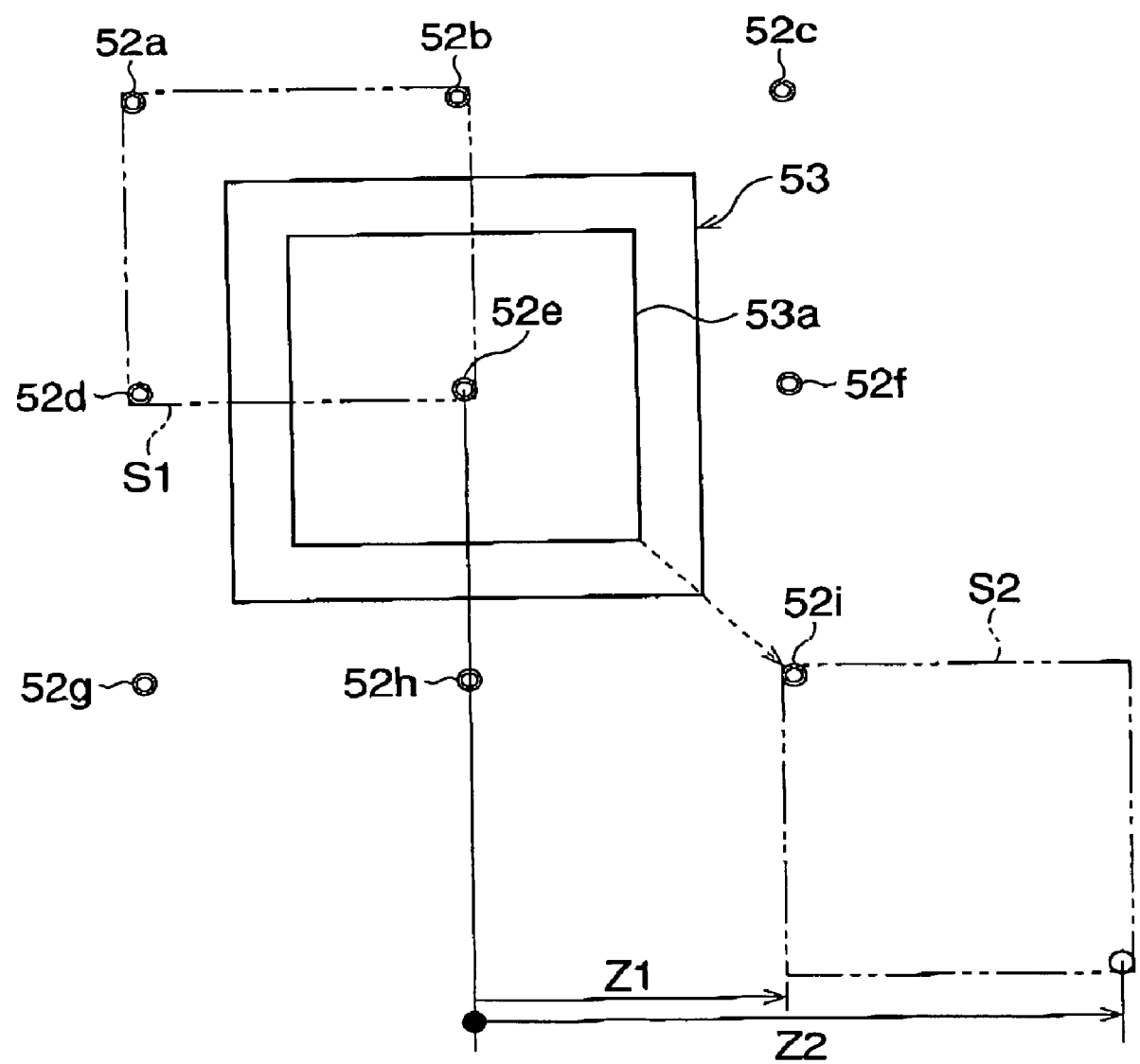
FIG. 5 illustrates an arrangement of LEDs.
Figure 6:
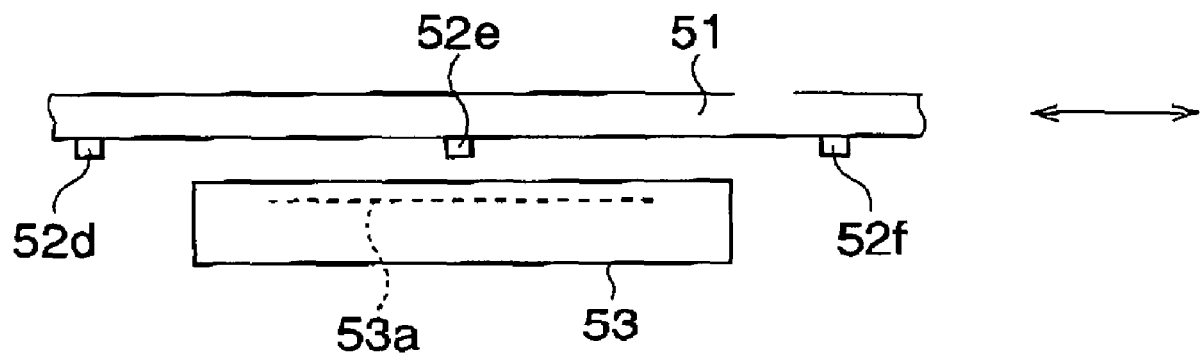
FIG. 6 illustrates an arrangement of the LEDs and a position-sensing device, which face each other.

With reference to FIG. 5 and FIG. 6, the relative position detecting operation with respect to the fixed member 31 will be explained.

As shown in FIG. 5, the nine LEDs 52a-52i are separately distributed over the position-sensing device and each emit a spotlight which is perpendicular to the light receiving area 53a of the position-sensing device 53. The light receiving area 53a, for the position-sensing device 53 to detect the spotlight, has a square shape, and its size is smaller than the area that is surrounded by the eight LEDs 52a-52d, and 52f-52i, which are arranged around the LED 52e. Specifically, a distance between two neighboring LEDs (for example, the distance between the LED 52a and the LED 52b, and the distance between the LED 52a and the LED 52d) is shorter than a side length of the light receiving area 53a. Namely, the size (area) of the square "S1" formed by the four LEDs 52a, 52b, 52d, and 52e, which are arranged in the upper left area in FIG. 5, is about the same size as that of the light receiving area 53a, so that spotlights emitted from the LEDs 52a, 52b, 52d, and 52e can be simultaneously received at the four corners of the light receiving area 53a.

In the initial state, as shown in FIG. 5, the light emitting unit 52 is arranged at the position where the center positioned LED 52e coincides with the center of the light receiving area 53a of the position-sensing device 53. In this state, only the LED 52e is turned on and the other LEDs are turned off. When the movable member (i.e., the casing 21, imaging device 23, coil-printed circuit board 24, and so on) is moved, a receiving position of the spotlight on the light receiving area 53a is displaced, and the position signals which indicate the light receiving position are output from the position-sensing device 53.

At the controller 61 (see FIG. 4), a relative position of the movable member with respect to the fixed member 31 is obtained in accordance with the position signals. When the center LED 52e is positioned within an area that corresponds to the area about the center of the light receiving area 53a, the position signals directly correspond to a relative position of the movable member with respect to the fixed member 31. Namely, in this state, any relative position is obtained by using only the spotlight emitted from the center LED 52e.

When the position-sensing device 53 is relatively moved rightward from the position of FIG. 5, so that the right side of the light receiving area 53a coincides with the right side LED 52f, the controller 61 determines that the right side LED 52f has come to a position corresponding to the receiving area 53a in accordance the position signals generated by the spotlight from the center LED 52e, and then turns on the right side LED 52f. Namely, the spotlight from the center LED 52e is irradiated to the left edge of the receiving area 53a and the spotlight from the right side LED 52f is irradiated to the right edge of the receiving area 53a. More specifically, the center LED 52e and the right side LED 52f are turned on and off alternately by the controller 61.

Figure 7:
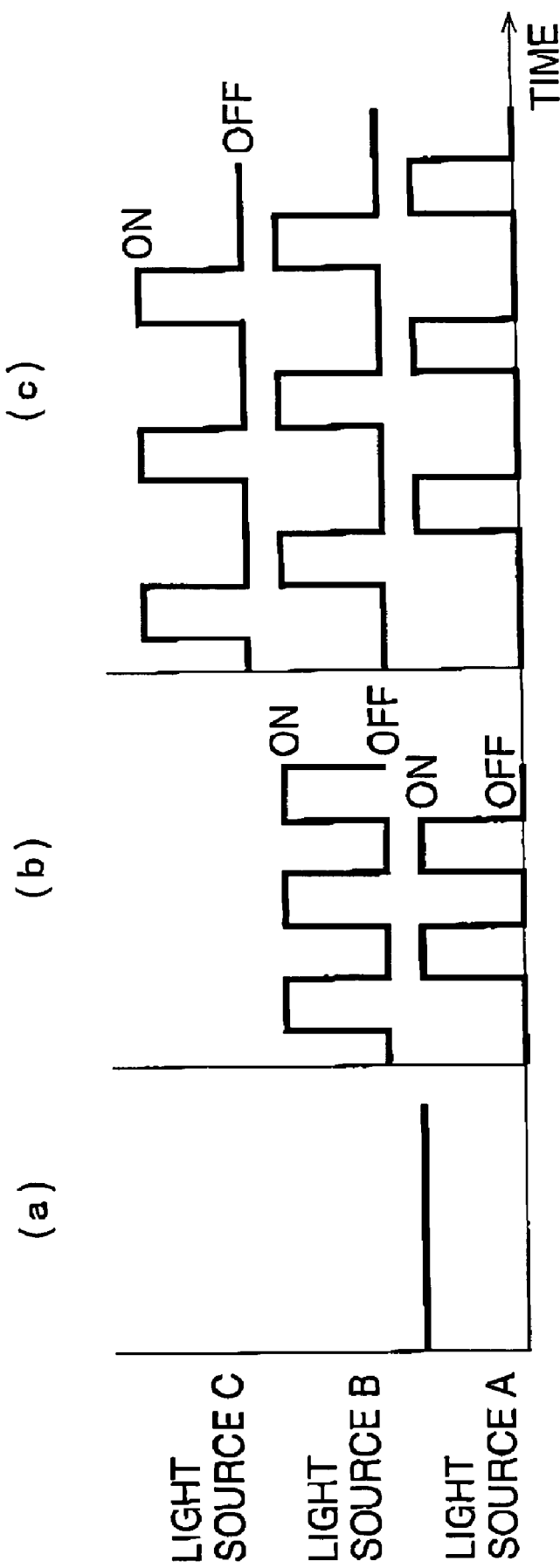
FIG. 7 shows ON/OFF states of the LEDs.

Namely, as shown in FIG. 7, when the relative movement of the movable member is small, only the center LED 52e (the light source "A") is continuously turned on (refer to FIG. 7, the signal sequence captioned by (a)). On the other hand, when the right side LED 52f (the light source "B") is also turned on, the LED 52e and the LED 52f are alternately turned on at the same cycle (refer to FIG. 7, the signal sequences captioned by (b)). The position calculating processor 62 determines that the LED 52e and the LED 52f are positioned at both edges of the light receiving area 53a, due to the flashing spotlights of the LED 52e and the LED 52f.

When the position-sensing device 53 is further relatively moved to the right direction, and when the left edge of the light receiving area 53a is positioned at the right side of the center LED 52e, the center LED 52e is turned off and only the right side LED 52f is continuously turned on. The position calculating processor 62 calculates a relative position of the movable member with respect to the fixed member 31 in accordance with the position signals due to the spotlight from the right side LED 52f. Namely, the calculation is carried out based on a light receiving position represented by a position signal and the displacement and the direction of the movement when the position-sensing device 53 is moved to the position of the LED 52f. For example, when the position-sensing device 53 is horizontally and relatively moved in the right direction with respect to each of the LEDs in FIG. 5, and when the position-sensing device 53 reaches the position of the LED 52f, the horizontal displacement vector regarding the position-sensing device 53 is added to the position vector indicated by a position signal due to the spotlight of the LED 52f.

When the movable member is structured so as to be able to relatively rotate with respect to the fixed member 31, the three LEDs (the light sources A, B, and C) are turned on and off, as shown on the right hand side of FIG. 7 (refer to the signal sequences captioned by (c)). In this case, each of three LEDs is alternately turned on and off in turn at the same cycle. Namely, only one of the LEDs is turned on at the same time.

As it is shown in FIG. 5, when the position-sensing device 53 is relatively moved to a right lower direction, and when the left upper corner of the light receiving area 53a reaches the position of the right lower LED 52i (refer to the square "S2" in FIG. 5), this situation indicates a limit of the detecting area regarding the right lower side of the position-sensing device 53. Namely, although a conventional detecting area "Z1" is limited to the distance from the LED 52e to a position where the LED 52e coincides with one of the edges of the light receiving area 53a of the position-sensing device 53, according to the present embodiment, the detecting distance or displacement is enlarged to the distance from the LED 52e to a position where one of the surrounding LEDs 52a-52d, and 52f-52i coincides with one of the edges of the light receiving area 53a, so that a detecting area "Z2" is extended twice in distance and four times in area.

As described above, according to the present embodiment, the position detecting area is enlarged without using any specific large area sensor (a position-sensing deice), and a normal low price two-dimensional square area sensor, such as a square area sensor having sides of 2 mm, can still be used.

Further, in the present embodiment, an LED is turned off while it is not able to irradiate a spotlight onto the position-sensing device, and flashes at the initial stage when the LED is turned on and at the final stage when the LED is turned off. Therefore, a blank spot or period in the detection operation does not occur and the detection can be carried out continuously, even when an LED used in the detection is switched from one to another. Further, electric consumption can be restrained by turning unnecessary light off.

Figure 8:
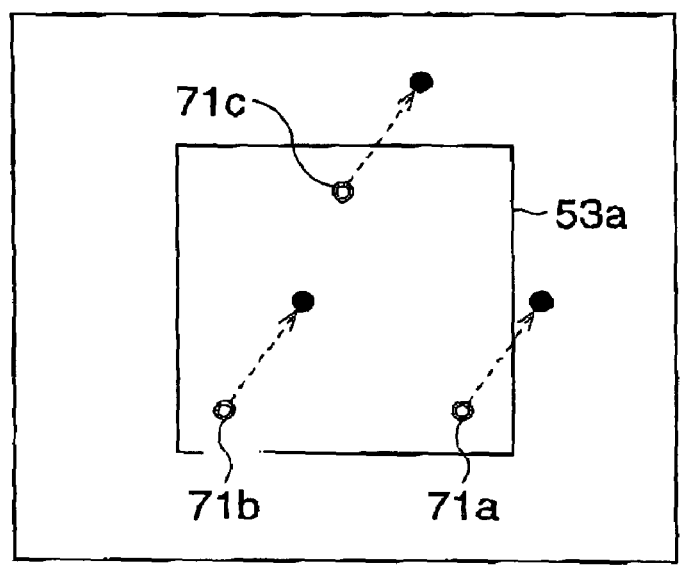
FIG. 8 illustrates an arrangement of the LEDs in a second embodiment.
Figure 9:
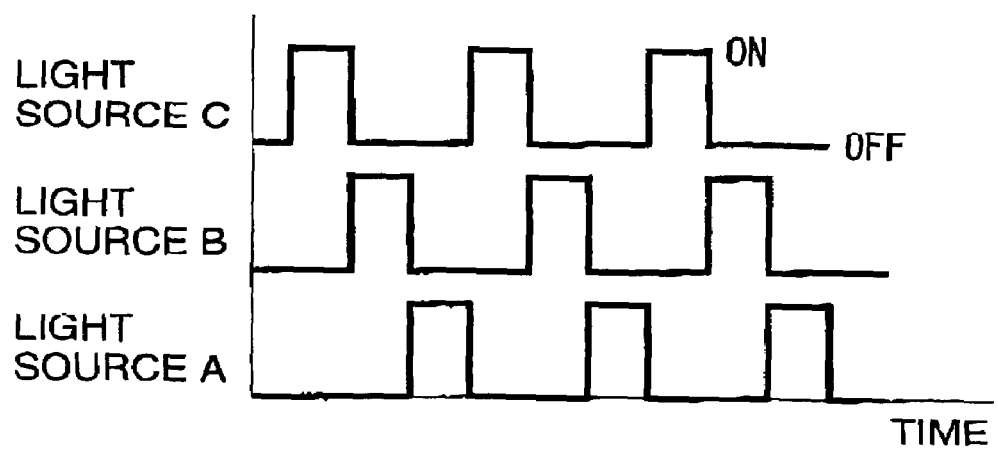
FIG. 9 shows ON/OFF states of the LEDs in the second embodiment.

With reference to FIGS. 8 and 9, a second embodiment of the present invention will be explained. The structure of the second embodiment is basically the same as that of the first embodiment. In the second embodiment, a plurality of LEDs 71a, 71b, and 71c are regularly turned on and turned off.

For example, the LEDs 71a, 71b, and 71c are arranged at positions which correspond to the vertices of a triangle, as shown in FIG. 8. Further, the LEDs 71a, 71b, and 71c are arranged so that spotlights from all of the LEDs 71a, 71b, and 71c are simultaneously irradiated to the light receiving area 53a of the position-sensing device 53. Namely, in FIG. 8, when the spotlight of the right lower LED 71a is irradiated to an area close to the right lower corner of the square of the light receiving area 53a, the spotlight of the left lower LED 71b is irradiated to an area close to the left lower corner of the light receiving area 53a, and the spotlight of the upper LED 71c is irradiated to an area close to the upper edge of the light receiving area 53a, below the upper edge.

As shown in FIG. 9, all of the LEDs 71a, 71b, and 71c (the light sources A, B, and C) are continuously flashed, so that generally, the light sources C, B, and A are cyclically and sequentially turned on. When all of the spotlights from the LEDs 71a, 71b, and 71c are received by the light receiving area 53a, three position signals are output from the position-sensing device 53, so that a relative position of the movable member with respect to the fixed member is obtained.

Here, the light receiving area 53a is relatively moved from the position where the three spotlights are received by the light receiving area 53a, in a lower left direction in FIG. 8. When the spotlight of the LED 71c is moved out from the light receiving area 53a, the fact that the spotlight of the LED 71c is moved out from the light receiving area 53a is detected based on the timing chart of the flashing sequence represented in FIG. 9. Therefore, when the spot light 71c moves past the receiving area 52a, only the spotlights of the LEDs 71a and 71b are detected, so that two position signals are output and the relative position of the movable member with respect to the fixed member is obtained in a similar way as that in the first embodiment.

Further, when the spotlight from the LED 71a is forced out from the light receiving area 53a, only the spotlight from the LED 71b is detected. Thereby, only one position signal is output from the position-sensing device 53 and the relative position of the movable member with respect to the fixed member is obtained in a similar way as in the first embodiment.

Note that, the present embodiments of the position-detecting sensor are for detecting a two-dimensional motion of the movable member with respect to the fixed member 31, however, the present invention can also be applied to a case where the movable member is movable in only one-dimension.

Further, according to the present invention, a plurality of light sources can also be provided on the fixed member while providing the position-sensing device on the movable member.

Figure 10:
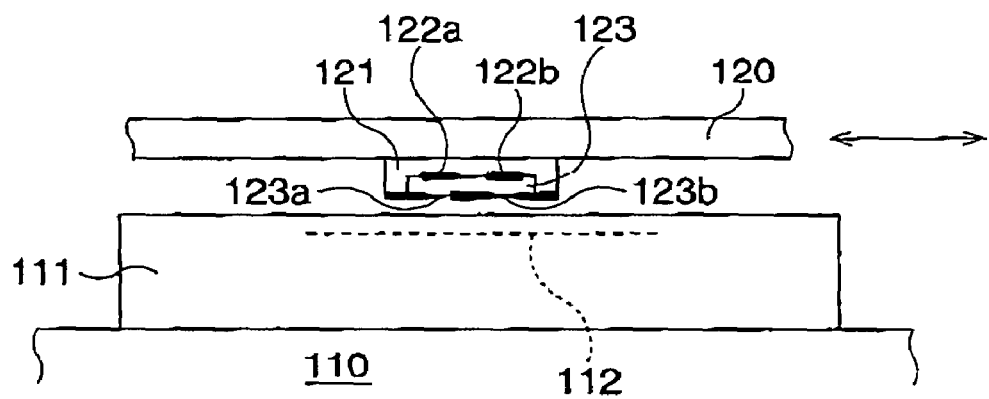
FIG. 10 is a sectional side elevation of a position-detecting system of a third embodiment to which the invention is applied.
Figure 11:
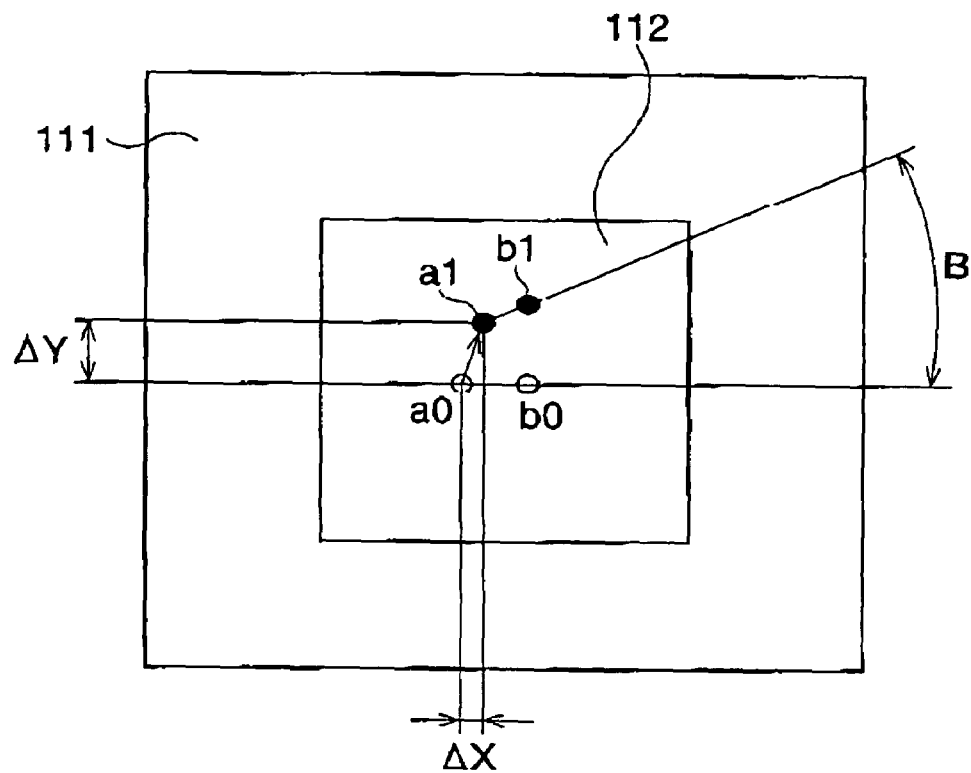
FIG. 11 illustrates a light receiving area of the position-sensing device of the position-detecting system of the third embodiment.
Figure 12:
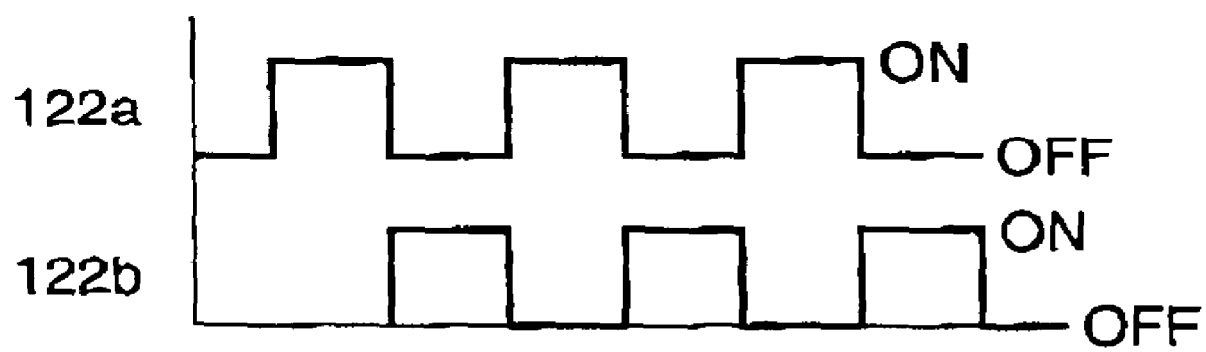
FIG. 12 is a timing chart that indicates the ON/OFF states of two light emitting devices of the third embodiment.

With reference to FIGS. 10-18, a third embodiment of the present invention will be explained. FIG. 10 is a side view of the position-detecting system of the third embodiment to which the present invention is applied. Further, FIG. 11 illustrates a light receiving area of the two-dimensional position-sensing device (PSD: position sensitive detector) of the position-detecting system. In this embodiment, an arrangement for detecting translation and rotation of a moving object, in a two-dimensional plane, with respect to the fixed member is described.

A movable board 120 is arranged in parallel with a fixed member 110, and is supported so as to be movable in directions represented by the arrows in FIG. 10 (X-directions). Further the movable board 120 is supported so as to be movable in directions (Y-directions) perpendicular to the surface of FIG. 10, and so as to be rotatable about an axis perpendicular to a plane including the X and Y-directions.

A two-dimensional position-sensing device (PSD) 111 is fixed on the fixed member 110, so that a receiving area 112 of the position-sensing device 111 is parallel with a plane including a trajectory defined by the motion of the movable board 120. On the other hand, a light source unit 121 is attached on the movable board 120 at a position that faces the light receiving area 112 of the position-sensing device 111.

Inside the light source unit 121, two light emitting devices, such as LEDs 122a and 122b are mounted. In front of each LED 122a and 122b, i.e. on the position-sensing device 111 side, a spot mask 123 is disposed. The spot mask 123, is perforated with holes 123a and 123b which penetrate the mask 123, enabling spotlight from the LEDs 122a and 122b to pass. Each of the spotlights emitted through each of the LEDs 122a and 122b is made incident to the light receiving area 112 of the position-sensing device 111 and forms respective spots "a" and "b". In the third embodiment, the LEDs 122a and 122b are alternately turned on and turned off at the same interval, as that shown in the timing chart of FIG. 12, so that the spot "a" of the LED 122a and the spot "b" of the LED 122b are alternately detected on the light receiving area 112.

Figure 13:
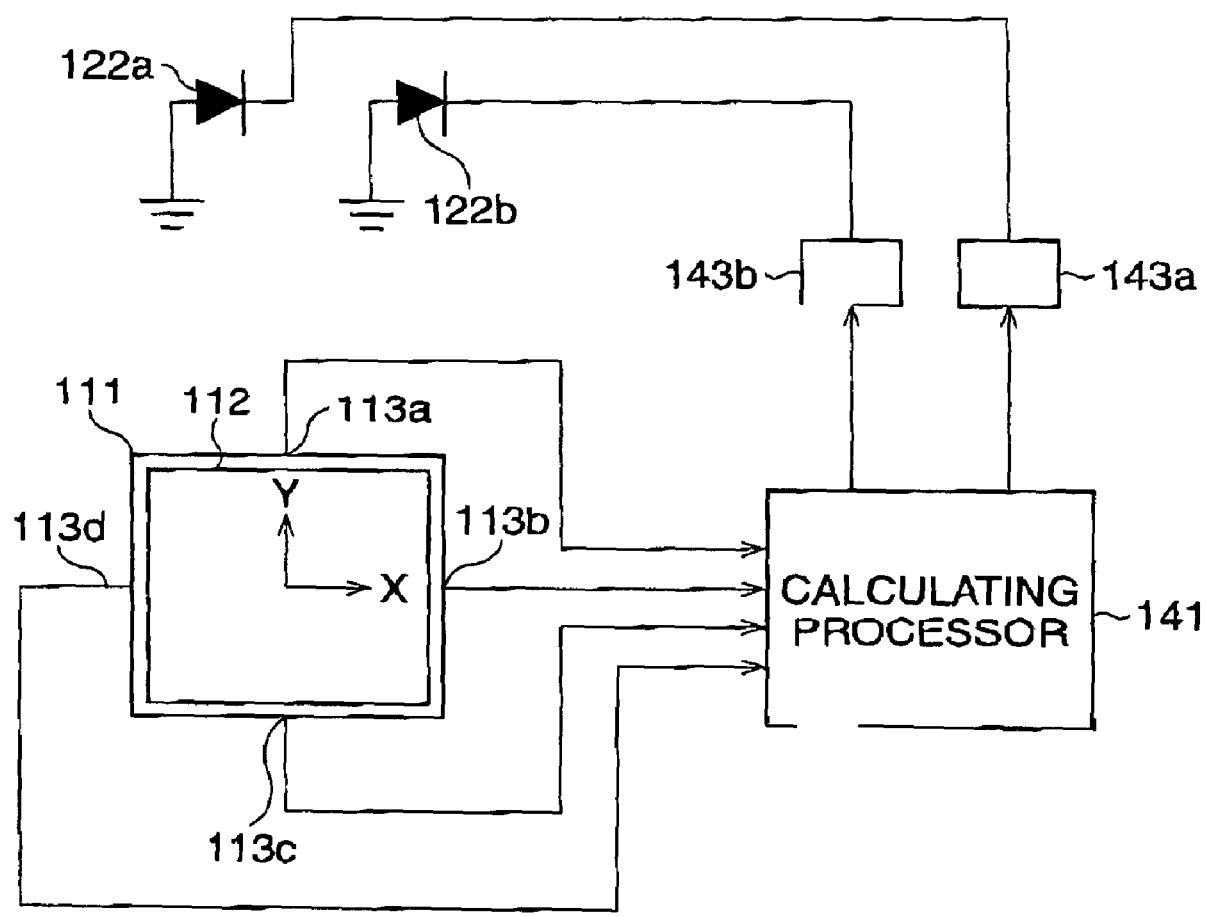
FIG. 13 is a block diagram showing an electrical schematic of the third embodiment.

FIG. 13 is a block diagram showing an electric schematic of the position-detecting system of the third embodiment. The LEDs 122a and 122b are turned on and turned off by a calculating processor 141 through driving circuits 143a and 143b. From output terminals 113a, 113b, 113c, and 113d, the position-sensing device 111 outputs position signals (current signals), corresponding to positions where the spot "a" or the spot "b" are formed while one of the LED 122a or the LED 122b is turned on. The position signals from each of the output terminals 113a-113d are input to the calculating processor 141. Based on these four outputs, the calculating processor 141 obtains a position of the spots "a" and "b" on the light receiving area 112, so that a position in the X-direction and a position in the Y-direction or coordinates (x, y) are calculated. Further, the calculating processor 141 detects positions of at least two pairs of spots "a" and "b" which are irradiated on the light receiving area 112 at a certain time interval, and stores them in a built-in memory. The calculating processor 141 calculates a direction, displacement, and an angle of rotation of the LEDs 122a and 122b in accordance with the above two pairs of position data.

In FIG. 11, the spots "a" and "b" of the LEDs 122a and 122b at the initial state are represented as white circles "a0" and "b0". The coordinates of the spot "a0" are denoted as $(x_{a0}, y_{a0})$ and coordinates of the spot "b0" are denoted as $(x_{b0}, y_{b0})$. The movable board 120 is moved with rotation from the above initial state, and thus the spots "a0" and "b0" of the LEDs 122a and 122b are moved to spots "a1" and "a2" on the light receiving area 112. Further, coordinates of the spot "a1" are denoted as $(x_{a1}, y_{a1})$ and coordinates of the spot "b1" are denoted as $(x_{b1}, y_{b1})$. There are obtained based on the outputs from the position-sensing device 111.

From the coordinates $(x_{a0}, y_{a0})$ and $(x_{b0}, y_{b0})$ of the spots "a0" and "b0" and the coordinates $(x_{a1}, y_{a1})$ and $(x_{b1}, y_{b1})$ of the spots "a1" and "b1", the distance ΔX between the spots "a0" and "a1" in the X-direction and the distance ΔY in the Y-direction, the distance "L" between the spots "a0" and "b0" (or between the spots "a" and "b") in the X-direction, and the distance ΔL between the spots "a1" and "b1" in the X-direction, can be obtained. Further, the angle of rotation θ of the movable board 120 can be obtained by substituting the distances "L" and ΔL in the following Eq. 1.

$$\theta = \cos^{-1}\frac{\Delta L}{L}$$

As described above, according to the third embodiment, not only a position of the movable board 120 in the X and Y-directions, but also a direction, displacement, and an angle of rotation θ for the motion of the movable board 120, can be detected. Note that, the movable board 120 is moved within a range in which the spotlights from the LEDs 122a and 122b are made incident to the light receiving area 112 and each forms the spots "a" and "b".

In the present embodiment, the position-sensing device 111 is attached on the fixed member 10 and the light source unit 121 is attached on the movable board 120. However, the light source can be attached on the fixed member and the position-sensing device can be attached on the movable board in an alternative embodiment, which is not shown.

Further, in the present embodiment, although only two LEDs 122a and 122b are provided as light emitting devices, the number of the light emitting devices can be two or more than two.

Next, an application of the inventive two-dimensional position-detecting system will be explained. FIGS. 14 to 18 illustrate an embodiment in which the position-detecting system shown in FIGS. 10-13 is applied to an anti-shake device of a digital camera, which compensates for the camera-shake by moving an imaging device.

Figure 14:
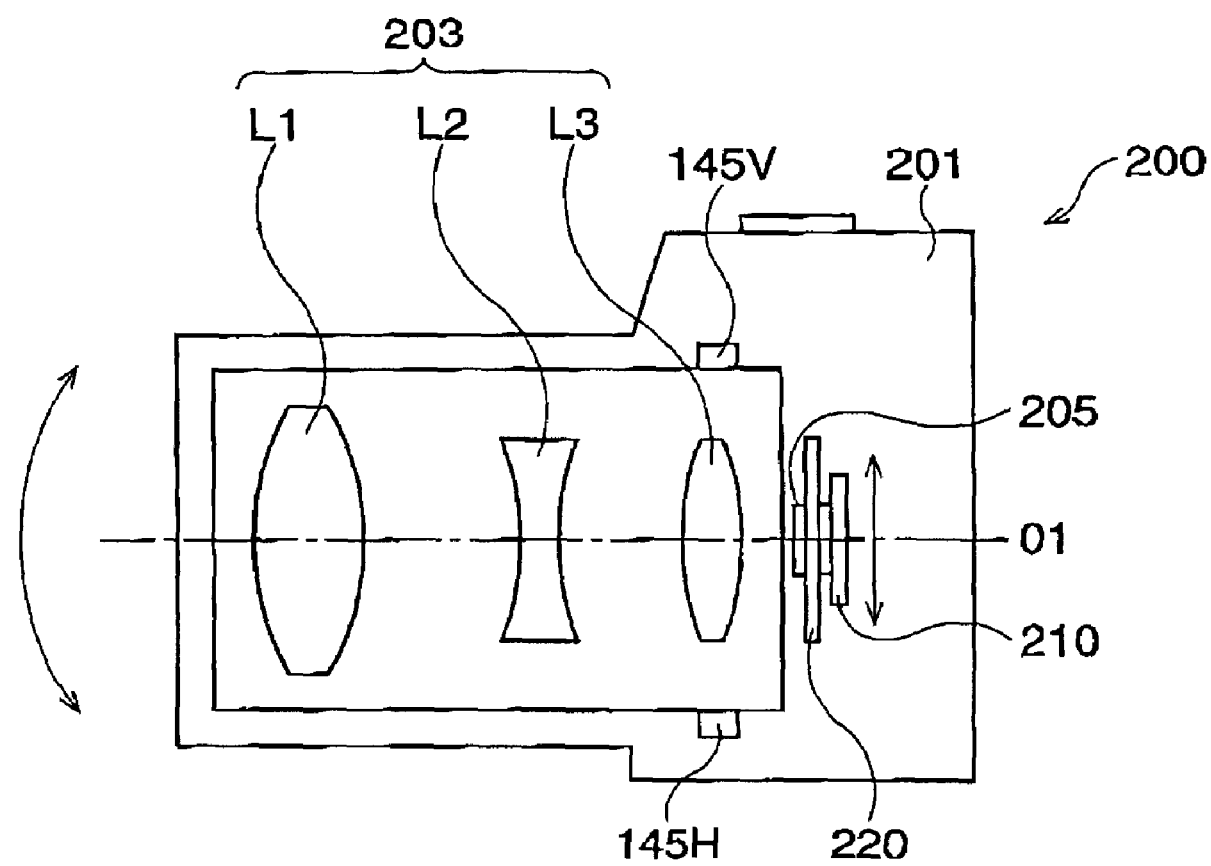
FIG. 14 is a sectional side elevation of a digital camera provided with an anti-shake device to which the third embodiment of the invention is applied.

FIG. 14 is a sectional side elevation of the digital camera provided with the anti-shake device including the position-detecting system of the present invention. The digital camera (body) 201 is provided with a photographing lens 203 including a plurality of lenses "L1", "L2", and "L3". The imaging device 205 is disposed behind the rearmost lens "L3". An image of an object is projected on the imaging surface of the imaging device 205 through the photographing lens 203. The imaging device 205 is supported by the anti-shake device, so that the optical axis "O1" of the photographing lens 203 perpendicularly penetrates the center of the imaging surface, and the imaging device 205 is arranged at the focal plane of the photographing lens 203.

The anti-shake device comprises a fixed member 210, which is fixedly attached to the digital camera 201, and a coil printed circuit board 220 (a movable stage or movable board), which is rotatably supported and movable with respect to the fixed board 210, in a plane perpendicular to the optical axis "O1" of the photographing lens. The imaging device 205 is provided on the coil printed circuit board 220. Further, the light source unit 121 and the position-sensing device 111 of the position-detecting system, which is used to detect the position and the angle of rotation the imaging device 205, is attached on the coil printed circuit board 220 and the fixed member 210

Figure 15:
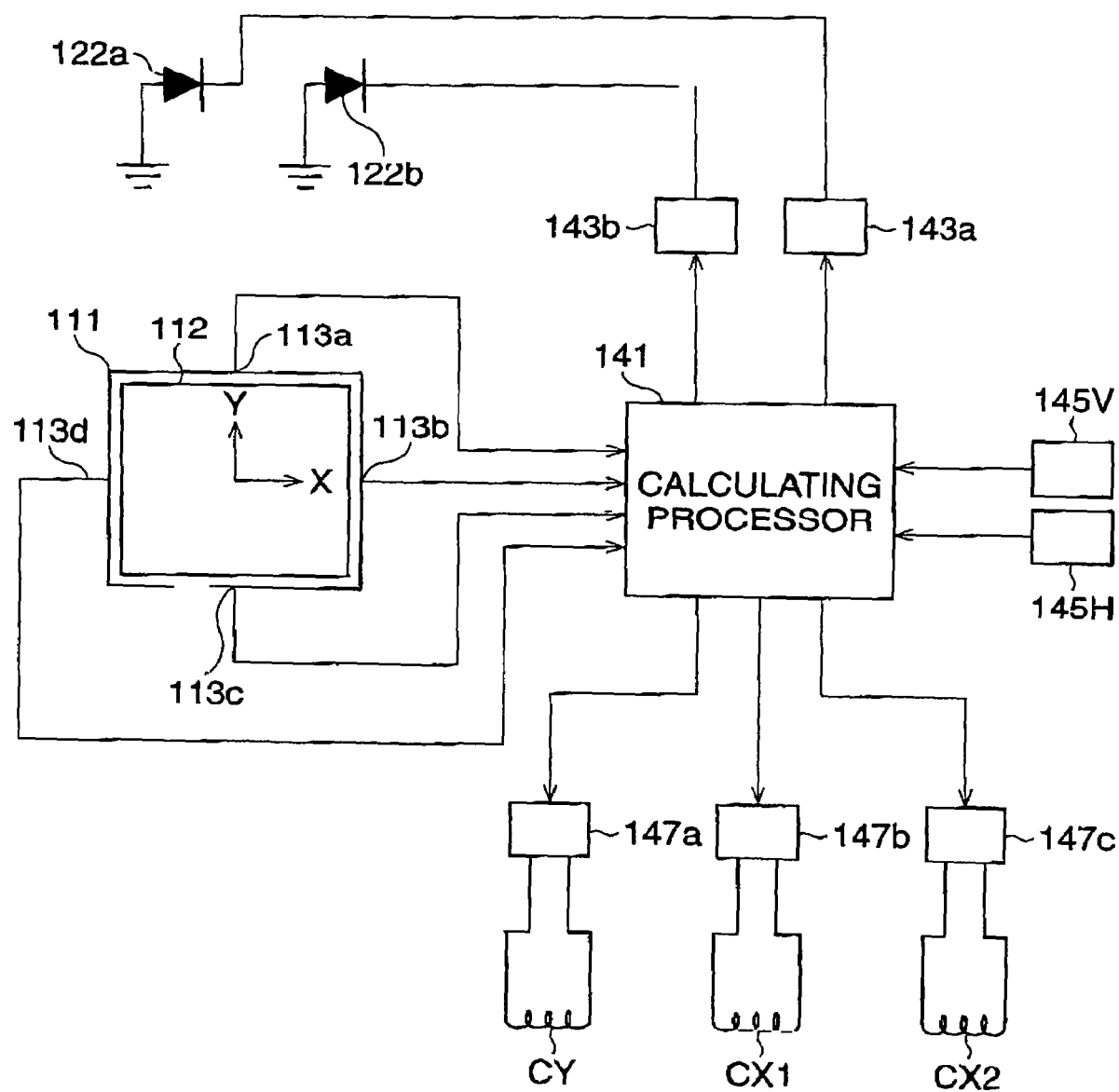
FIG. 15 is a block diagram showing an electrical schematic of the anti-shake device.

Further, the digital camera 201 is provided with angular velocity sensors, such as a vertical angular velocity sensor 145V and a horizontal angular velocity sensor 45H, in order to detect a shake of the digital camera 201 or more specifically a shake of the optical axis "O1" of the photographing lens 203. FIG. 15 is a block diagram showing an electric schematic of an anti-shake drive system. In addition to the position-detecting system illustrated in FIG. 13, the anti-shake drive system is further provided with the vertical and horizontal angular velocity sensors 145V and 145H, three drive coils CY, CX1, and CX2 which are used to actuate the stage, and drivers 147a, 147b, and 147c that supply electricity to each of the drive coils CY, CX1, and CX2.

A vertical angular velocity signal and a horizontal angular velocity signal, which are detected by the vertical and horizontal angular velocity sensors 145V and 145H, are input to the calculating processor 141, so that the calculating processor 141 calculates a direction, a speed, and displacement for movement of the imaging device 205 in order to counteract relative movement of the object image projected on the imaging surface through the photographing lens 203, with respect to the imaging surface, in accordance with the vertical and horizontal angular speed signals. Thereby, the calculating processor 141 supplies current to the drive coils CY, CX1, and CX2 in accordance with a result of calculation, to move the coil printed circuit board 220. At this time, the calculating processor 141 alternately turns on the LEDs 122a and 122b, and inputs the position signals from each of the terminals 113a-113d of the position-sensing device 111. The calculating processor 141 further calculates the position and rotating angle of the coil printed circuit board 220, and controls the electric supply to the drive coils CY, CX1, and CX2.

Figure 16:
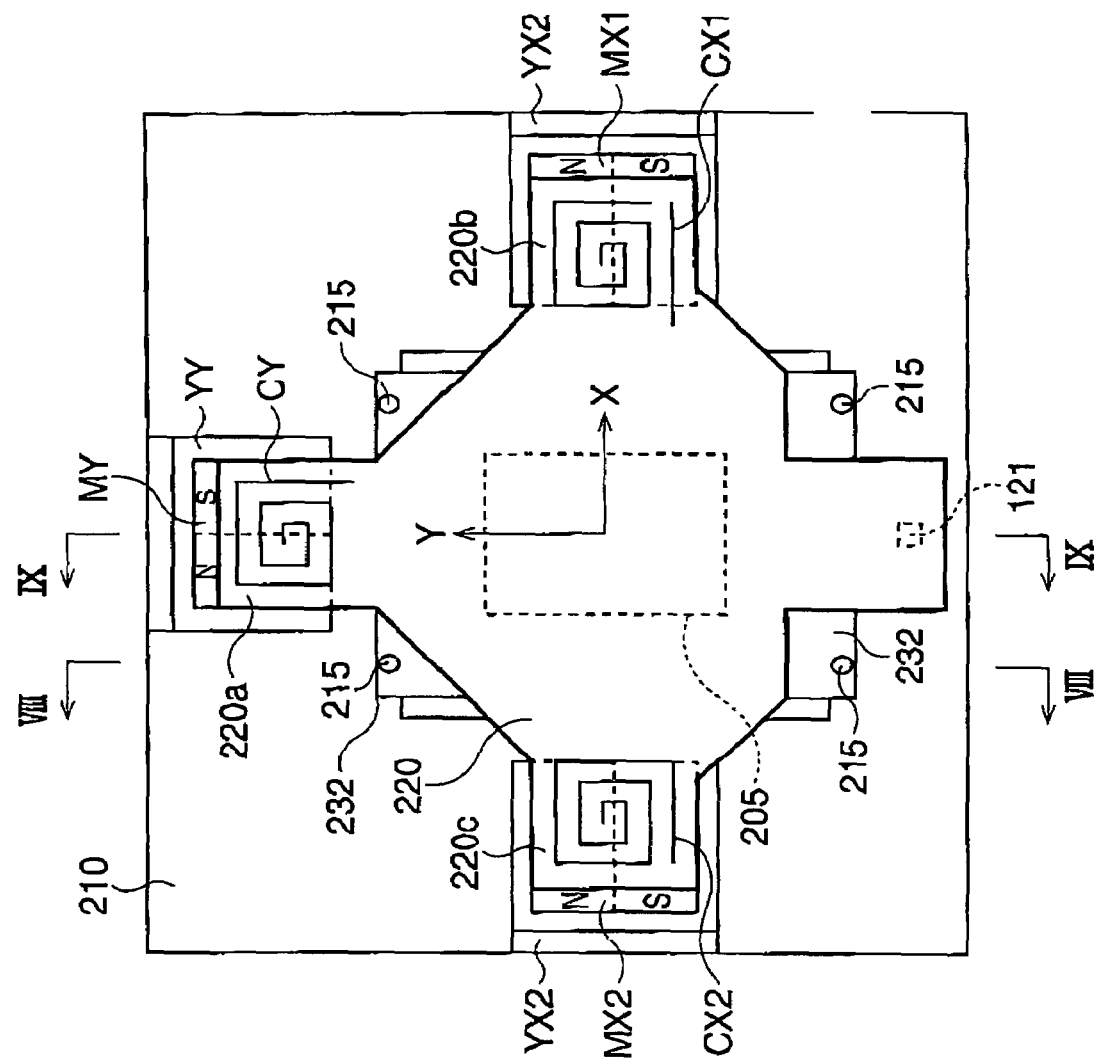
FIG. 16 is a rear view showing a main part of the anti-shake device.
Figure 17:
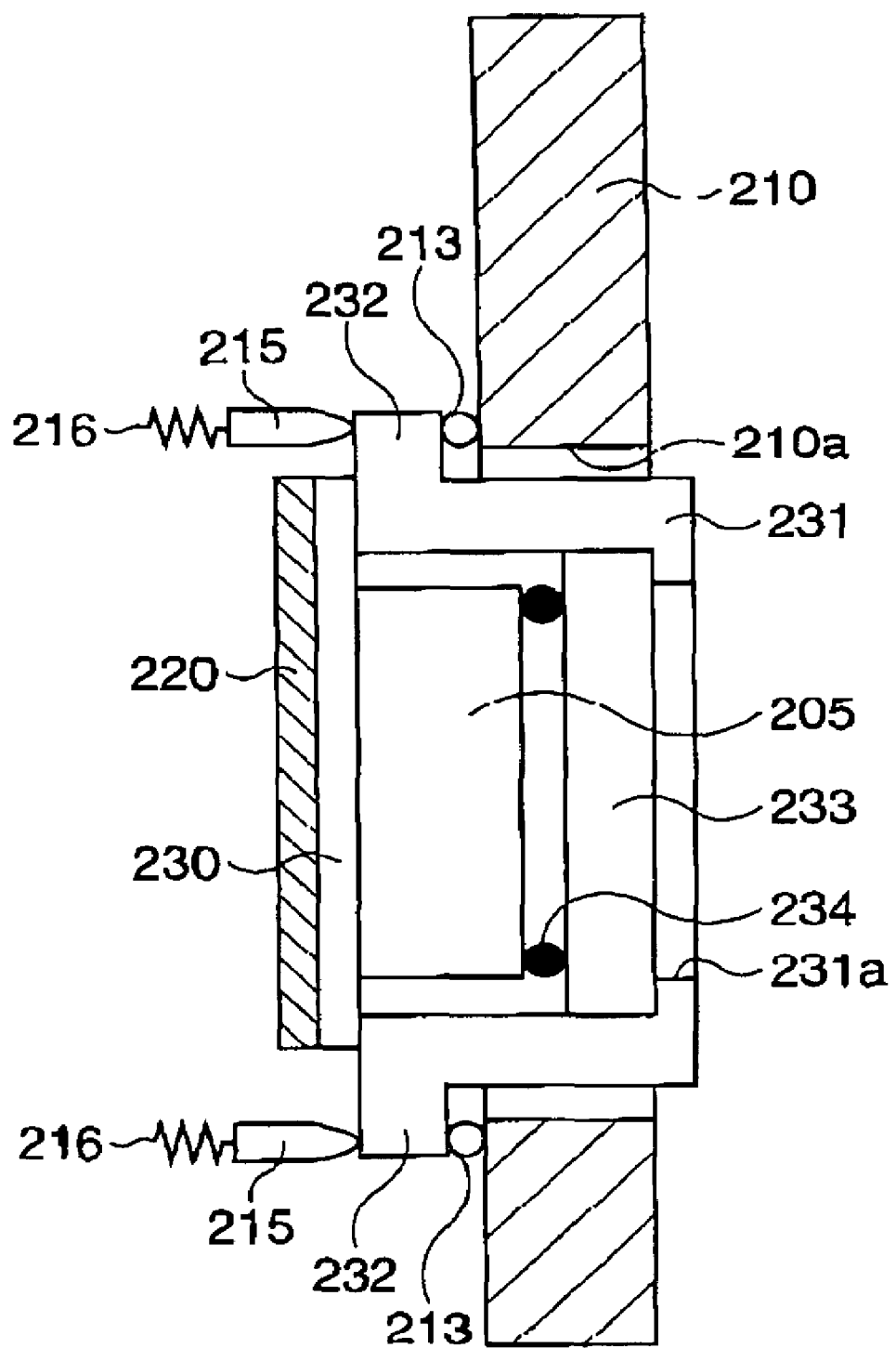
FIG. 17 is a sectional view of the anti-shake device along a line VIII-VIII of FIG. 16.
Figure 18:
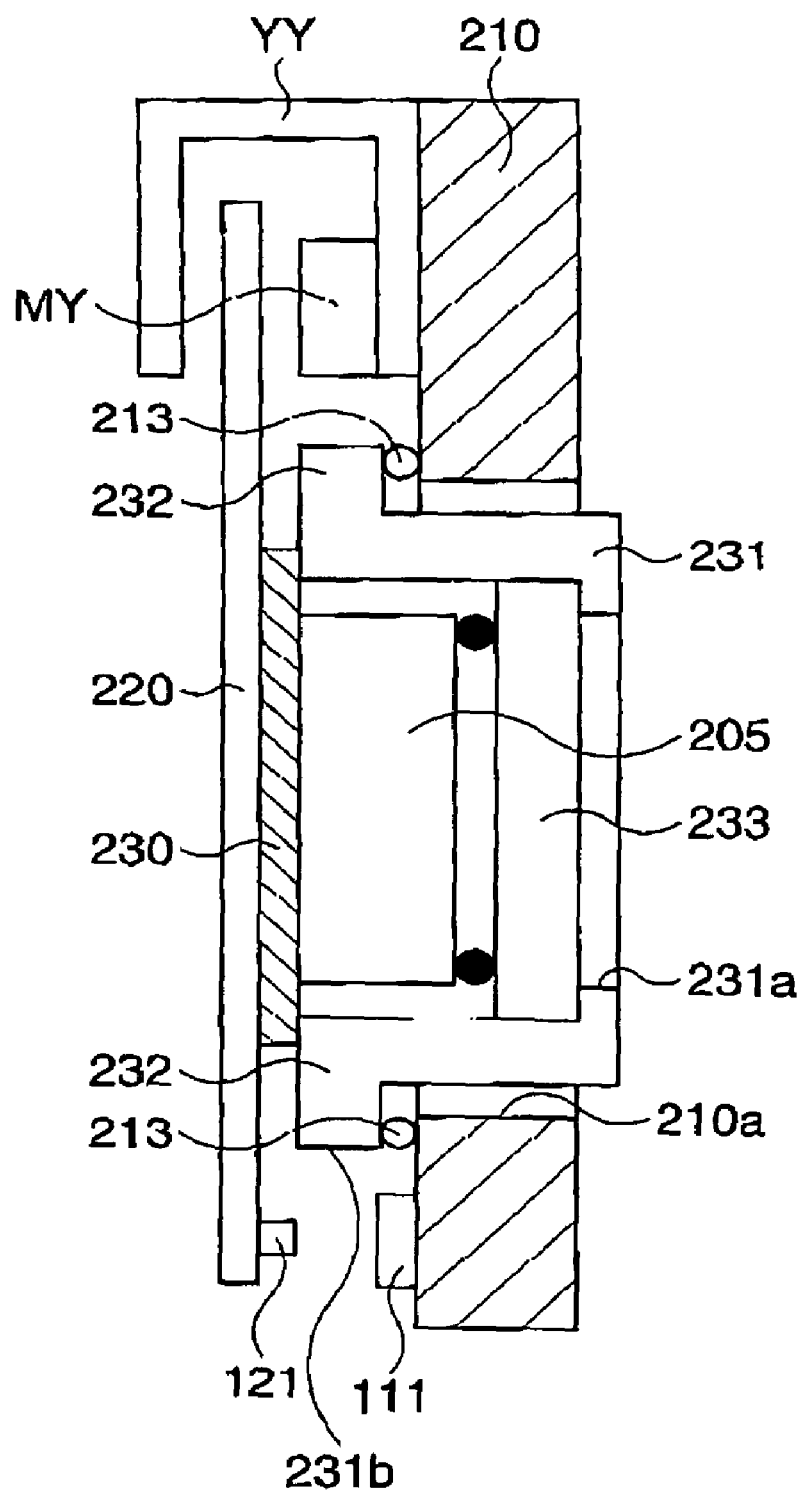
FIG. 18 is a sectional view of the anti-shake device along a line IX-IX of FIG. 16.

With reference to FIGS. 16 to 18, a mechanical structure of the anti-shake device of the present embodiment will be further explained.

The coil printed circuit board 220 is supported above the fixed member 210 so as to be movable and rotatable in any direction, but is always maintained to be coplanar. The imaging device 205 is attached via a base plate 230 in front of the coil printed circuit board 220 (a side of the imaging object). On the front face of the base plate 230, a rectangular parallelepiped casing 231 is attached so as to enclose the imaging device 205. A rectangular opening 231a is formed on the front face of the casing 231. The shape and the size of the opening 231a are formed so as not to trim an object image projected by the photographing lens on the imaging surface of the imaging device 205.

An optical low-pass filter 233 is arranged inside the casing 231 whereby the optical low-pass filter 233 abuts against a frame that forms the opening 231a. Between the optical low-pass filter 233 and the periphery of the imaging surface of the imaging device 205, an urging member 234, which seals space between the optical low-pass filter 233 and the imaging device 205 (imaging surface), is provided.

The casing 231 noncontactingly penetrates the opening 210a formed in the fixed member 210. The size of the opening 210a is a size that defines the outermost limit of a movable area of the casing 231 in the anti-shake operation, and is larger than a range required for the casing 231 to be moved in the anti-shake operation.

A flange 232 extends out from all sides of the casing 231, which is fixedly attached to the base plate 230, so that the flange 232 covers the outer periphery of the opening 210a of the fixed member 210. Between each corner of the flange 232 of the casing 231 and the fixed member 210, bearings, such as ball bearings 213, are arranged, in order to support the flange 232 to be freely movable in any direction in a required plane while keeping the distance between the flange 232 and the fixed member 210 constant.

Each corner of the backside of the flange 232 is exposed, so that urging shafts 215 biased by springs 216 contact the flange 232. The tips of the urging shafts 215, which contact the flange 232, are formed as hemispheric shapes from material that has low-static friction and low slip-friction with respect to the flange 232.

Because of the effect of the ball bearing 213 and the urging shaft 215, relative motion between the casing 231 and the fixed member 210 is enabled due to the ball bearings 213 rolling in the flange 232 of the fixed member 210. Thereby, the casing 231 is supported, and is movable in any direction and rotatable.

In the above embodiment, the fixed member 210 and the flange 232, where the ball bearings 213 contact, are both configured as a flat plane. However, one of the faces can also be configured to have hemispheric concave hollows, which receive the ball bearings 213, so that the ball bearings 213 roll inside the concave hollows.

Many wires are printed on the coil printed circuit board 220 (which are omitted in the figures), and the wires are electrically connected to the terminals of the imaging device 205. The coil printed circuit board 220 is provided with four rectangular-shaped extended board sections 220a, 220b, 220c, and 220d, which extend in four directions from the center section where the base plate 230 and imaging device 205 are attached. On the backside of each of the rectangular-shaped extended board sections 220a, 220b, and 220c, a spiral sheet coil pattern is printed, such as an X-direction drive coil "CX", and first and second Y-direction drive coils "CY1" and "CY2".

The light source unit 121 is mounted on the front face of the remaining rectangular-shaped extended board section 220d. Lead wires of the LEDs 122a and 122b are connected to corresponding wires on the coil printed circuit board 220. On the fixed member 110, the position-sensing device 111 is attached at a position facing the light source unit 121. The configurations of the light source unit 121 and the position-sensing device 111 are the same as those described in FIG. 10.

Note that, each of the wires of the coil printed circuit board 220 is connected to a fixed printed circuit board inside the digital camera 201 via a flexible printed circuit board (not shown), so as not to disturb the translation and rotation of the coil printed circuit board 220.

As is shown in FIG. 16, the Y-direction drive coil "CY" and the first and second X-direction drive coils "CX1" and "CX2" are formed as a rectangular spiral with a linear side. For convenience, the drive coils "CY", "CX1", and "CX2" are represented by a wire being wound several turns, in fact, the wire is wound several tens of turns. Each of the terminals from the drive coil "CY", "CX1", and "CX2" is connected to the drivers 147a, 147b, 147c via the wires printed on the coil printed circuit board 220, the flexible printed circuit board, and so on.

On the backside of the fixed member 210, three yokes "YY", "YX1", and "YX2" having a U-shaped section profile and formed from a magnetic substance, such as a steel plate, are fixedly attached in each of three positions. Magnets "MX" and "MY" are affixed on each of the yokes "YY", "YX1", and "YX2", on the inside faces of each yoke and nearby each tip. The magnet "MY" of the yoke "YY" is arranged so that the N pole and the S pole are aligned in the X-direction. The magnets "MX1" and "MX2" of the yokes "YX1" and "YX2" are arranged so that the N pole and the S pole are aligned in the Y-direction. Each of the yokes "YX1" and "YX2" face the respective magnets "MX1" and "MX2", so that a magnetic field, where the lines of magnetic force are concentrated, is produced in a space between the yoke and the magnet. Similarly, a magnetic circuit where the lines of magnetic force are concentrated in a space between the yokes and the magnet, is produced. The rectangular-shaped extended board sections 220b and 220c are noncontactingly interposed between the yokes "YX1", "YX2" and the magnets "MX1" and "MX2". Further, the rectangular-shaped extended board section 220a is noncontactingly interposed between the yoke "YY" and the magnet "MY". Thereby, each of the extended board sections 220a, 220b, and 220c which is arranged within the space between the yokes and the magnets, is movable in the X-direction and the Y-direction, and is rotatable in the X-Y plane.

When electricity is supplied to one of the drive coils "CY", "CX1", and "CX2", the imaging device 205, the coil printed circuit board 220, and the base plate 230, are moved in one direction. When electricity is supplied to two of the drive coils (such as drive coils "CX1" and "CX2"), as the respective drive coils to be move in opposite directions, the coil printed circuit board 220 will be rotated. In addition to the above-operation, if electricity is further supplied to the drive coil "CY", the coil printed circuit board 220 is moved along X-direction while rotating. Namely, the coil printed circuit board 220 can be moved in the X-direction, the Y-directions, and can also be rotated, either separately or at the same time, in accordance with a combination of electric supply to the drive coils "CY", "CX1", and "CX2".

In the anti-shake device of the present embodiment, the calculating processor 141 calculates velocity and displacement in the X and Y-directions based on the vertical and horizontal angular velocity detected by the angular velocity sensor 145V and 145H, so that the coil printed circuit board 220 is translated in the X and Y-directions, and rotated, by controlling the electric supply to each of the drive coils "CY", "CX1", and "CX2" in accordance with the detected velocity and the translation. When the coil printed circuit board 220 is moved and rotated, the spots "a" and "b" illuminated on the light receiving area of the position-sensing device 111 are also moved, so that the detected position signals from the output terminals 13a, 13b, 13c, and 13d of the position-sensing device 111 are varied. The calculating processor 141 calculates the position and the rotation of the coil printed circuit board 220 based on the detected position signals, and controls the electric supply to each of the drive coils "CY", "CX1", and "CX2".

In the third embodiment, since the position-detecting system includes two light emitting devices for detecting the position of the coil printed circuit board 220, not only translation of the coil printed circuit board 220 in two orthogonal directions, but also rotation, can be detected. Therefore, image blur induced by rotation about the optical axis can also be compensate for, as well as a camera-shake in the horizontal or vertical directions.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2004-309415 (filed on Oct. 25, 2004) and No. 2005-00329 (filed on Jan. 5, 2005), which are expressly incorporated herein, by reference, in their entirety.

The invention claimed is:

1. A position-detecting system, comprising:
   a movable member that is moved in a two-dimensional plane relative to a fixed member;
   a light source unit that is provided on one of said fixed member and said movable member, and said light source unit comprises a plurality of light emitting devices which is separately disposed at a predetermined distance;
   a position-sensing device that is provided on another one of said fixed member and said movable member, and which receives light from said light source unit and detects a position where said light is received;
   a light-source controller that selectively turns on one of said plurality of light emitting devices in a predetermined order; and
   a calculator that calculates a direction, displacement, and rotation of motion of said movable member in accordance with two pairs of position data, in which one pair of position data represents positions where light from a pair of light emitting devices is detected and the other pair of position data represents positions where light from said pair of light emitting devices is detected at a predetermined time interval after said one pair of position data is detected.

2. A position-detecting system according to claim 1, wherein the number of said plurality of light emitting devices is two, and said light-source controller alternately turns on said two light emitting devices over the same interval.

3. A position-detecting system according to claim 1, wherein said movable member is rotatably supported with respect to the fixed member.

* * * * *